US008800391B2

(12) United States Patent
Zhang et al.

(10) Patent No.: US 8,800,391 B2
(45) Date of Patent: Aug. 12, 2014

(54) PIEZO-RESISTIVE FORCE SENSOR WITH BUMPS ON MEMBRANE STRUCTURE

(75) Inventors: Xueren Zhang, Singapore (SG); Andrea Lorenzo Vitali, Bergamo (IT); Federico Giovanni Ziglioli, Via Adamello (IT); Bruno Biffi, Codogno (IT); Tong Yan Tee, Singapore (SG)

(73) Assignee: STMicroelectronics Asia Pacific Pte, Ltd., Singapore (SG)

( * ) Notice: Subject to any disclaimer, the term of this patent is extended or adjusted under 35 U.S.C. 154(b) by 1797 days.

(21) Appl. No.: 11/803,152

(22) Filed: May 11, 2007

(65) Prior Publication Data

US 2008/0178691 A1 Jul. 31, 2008

(30) Foreign Application Priority Data

May 15, 2006 (SG) ................. 200603236-1

(51) Int. Cl.
*G01L 1/04* (2006.01)
*G01L 1/18* (2006.01)

(52) U.S. Cl.
USPC ................. 73/862.632; 73/862.637

(58) Field of Classification Search
USPC ........ 73/862.632, 862.627, 862.629, 862.637
See application file for complete search history.

(56) References Cited

U.S. PATENT DOCUMENTS 5,279,394 A * 1/1994 Wollenweber et al. .. 188/1.11 E
2005/0212355 A1* 9/2005 Godlewsky et al. ............ 303/20

OTHER PUBLICATIONS

Jurgen, Ronald K. Automotive Electronics Handbook. $2^{nd}$ ed. McGraw-Hill, 1999. p. 2.18 and 2.20.*

* cited by examiner

*Primary Examiner* — Lisa Caputo
*Assistant Examiner* — Punam Roy

(57) ABSTRACT

A force sensor to measure a force from a load includes a plunger, a flexible disc-shaped membrane, a support plate and a silicon die. The plunger is configured to receive the force from the load, and has a ring-shaped groove at the lower surface. The membrane has a ring-shaped upper bump at the upper surface configured to complementarily fit into the groove at the lower surface of plunger and a ring-shaped lower bump at lower upper surface. The support plate has a ring-shaped groove for complementary fit into the lower bump on the lower surface of the membrane. The silicon die is centrally mounted on the membrane and comprises piezo-resistors with resistance that varies when deformed by the force. Force received by the plunger is transmitted to the membrane, causing the membrane to flex and bending or compressing of the silicon die, resulting in the measurement of the force.

24 Claims, 5 Drawing Sheets

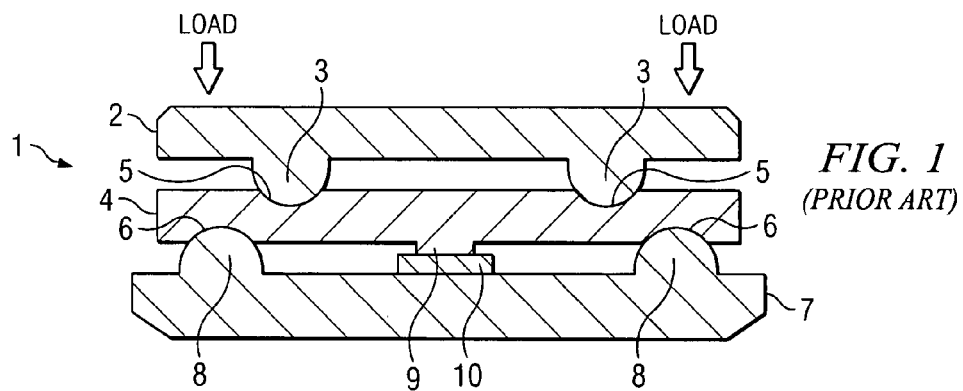
FIG. 1 *(PRIOR ART)*
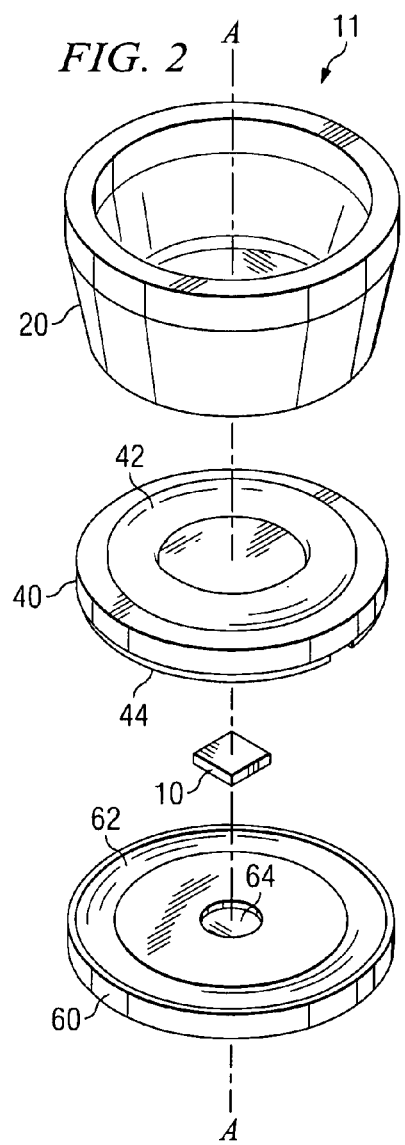
FIG. 2
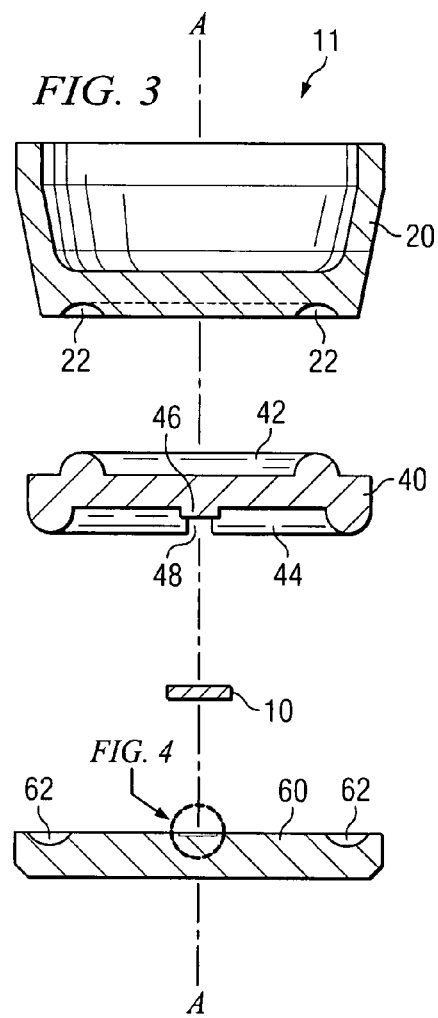
FIG. 3
FIG. 4

PIEZO-RESISTIVE FORCE SENSOR WITH BUMPS ON MEMBRANE STRUCTURE

CROSS-REFERENCE TO RELATED APPLICATIONS

The present application is related to Singapore Patent Application No. 200603236-1, filed May 15, 2006, entitled "PIEZO-RESISTIVE FORCE SENSOR WITH BUMPS ON MEMBRANE STRUCTURE". Singapore Patent Application No. 200603236-1 is assigned to the assignee of the present application and is hereby incorporated by reference into the present disclosure as if fully set forth herein. The present application hereby claims priority under 35 U.S.C. §119(a) to Singapore Patent Application No. 200603236-1.

TECHNICAL FIELD

The present application generally relates to devices for sensing a force, and more particularly to a piezo-resistive force sensor for use in, for example, vehicle brake applications.

BACKGROUND

Force sensing devices such as, for example, piezo-resistive force sensors have become more popular in electro-mechanical systems because they provide precise and reliable force sensing performance in a compact package. Furthermore, the compact package of the piezo-resistive force sensor facilitates easy integration into the electro-mechanical systems. The piezo-resistive force sensor operates on the principle that the silicon implanted piezo-resistors vary their resistance when deformed by a force. Typically, these piezo-resistors are fabricated in a silicon die/chip, where the silicon die/chip is configured to flex or compress by such forces.

Vehicles, as transport means, have become an important part of society. Typically, driving a vehicle requires the constant use of brakes to slow down or stop the vehicle. The inefficiency of a braking system can result in traffic accidents and other undesirable consequences. Therefore, knowledge and control of the braking force is important to improve the efficiency of the braking system. The piezo-resistive force sensors are integrated in vehicle braking systems to measure and facilitate control of the braking force, thus improving the overall braking performance.

FIG. 1 illustrates a piezo-resistive force sensor 1 for use in, for example, brake applications. The force sensor 1 includes a plunger 2, a flexible membrane 4 a silicon die 10, and a support plate 7. The plunger 2 is configured to receive a force from a load, wherein the plunger 2 transmits the force to the membrane 4. In particular, the lower surface of the plunger 2 has a ring-shaped bump 3 that complementarily fits into a ring-shaped groove 5 at the upper surface of the membrane 4. The membrane 4 is supported by the fixed support plate 7, wherein the lower surface of the membrane 4 has another ring-shaped groove 6 configured to allow a ring-shaped bump 8 on the support plate 7 to fit into. Furthermore, the lower surface of the membrane 4 has a centrally disposed convex step 9 that secures the silicon die 10 between the membrane 4 and the support plate 7.

The configuration of the force sensor 1 works under the principles of a lever mechanism, wherein the bump 8 on the support plate 7 acts as a fulcrum element for the membrane 4, and wherein the membrane 4 acts as a lever element. When the plunger 2 receives a force from the load, the force is transmitted to the membrane 4, causing the membrane 4 to flex. The flexing of the membrane 4 bends and/or compresses the silicon die 10, thus resulting in the silicon die 10 making a measurement of the force from the load. During this operation, a large proportion of the force applied on the membrane 4 is transmitted from the groove 5 to the groove 6. The force applied on both grooves (5, 6) of the membrane 4 creates a high level of stress on the membrane 4. Thus, the membrane 4 is easily subjected to fracture and other stress-induced deformation which reduce the durability and reliability of the structure. Furthermore, the accuracy of the force measurement also decreases.

There is therefore a need for durable and reliable piezo-resistive force sensors to provide precise measurements of force.

SUMMARY

The present disclosure generally provides a device for sensing a force, and more particularly to a piezo-resistive force sensor for use in a vehicle brake system to improve the overall braking performance.

Accordingly, in one aspect, the present invention provides a device for measuring the force from a load, the device comprising a plunger configured to receive the force from the load, wherein the lower surface of the plunger has a ring-shaped first groove; a disc-shaped membrane having an upper surface and lower surface, wherein the membrane is flexible according to the force received by the plunger, wherein the upper surface of the membrane has a ring-shaped first bump, the first bump configured to complementarily fit into the first groove on the lower surface of the plunger, and wherein the lower surface of the membrane has a ring-shaped second bump; a sensing means centrally disposed on the membrane, wherein the sensing means measures the force of the load when being bent or compressed caused by the membrane; a support plate having a ring-shaped second groove that is configured so that the second bump on the lower surface of the membrane can complementarily fit into; and whereby the force received by the plunger from the load is transmitted to the membrane, causing the membrane to flex, which in turn causes the bending or compressing of the sensing means, resulting in the measurement of the force from the load.

In another aspect, the present invention provides braking system coupled to at least one wheel of a vehicle to control the braking force thereupon, the braking system comprising a pedal for inputting an initial braking pressure to the at least one wheel; a braking device coupled to the at least one wheel, wherein the braking device is configured to apply the initial braking pressure on the at least one wheel, and further wherein the braking device comprises a sensor to measure the braking pressure applied to the at least one wheel, the sensor comprising, a plunger configured to receive the applied braking force, wherein the lower surface of the plunger has a ring-shaped first groove; a disc-shaped membrane having an upper surface and lower surface, wherein the membrane is flexible according to the applied braking force received by the plunger, wherein the upper surface of the membrane has a ring-shaped first bump, the first bump configured to complementarily fit into the first groove on the lower surface of the plunger, and wherein the lower surface of the membrane has a ring-shaped second bump; a sensing means centrally disposed on the membrane, wherein the sensing means measures the applied braking force when being bent or compressed caused by the membrane; a support plate having a ring-shaped second groove that is configured so that the second bump on the lower surface of the membrane can complementarily fit into; and whereby the applied braking force received by the plunger is transmitted to the membrane, causing the membrane to flex, which in turn causes the bending or compressing of the sensing means, resulting in the measurement of the applied braking force; and a control unit electrically coupled to the braking device to control the braking pressure on the at least one wheel, wherein the control unit is configured to receive the measurement of the applied braking force from the braking device, and to process the measurement of the applied braking force to control the braking pressure on the at least one wheel.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which:

FIG. 1 is an illustrative diagram showing the cross-sectional view of a piezo-resistive force sensor;

FIG. 2 is an illustrative diagram showing a perspective view of the unassembled force sensor in accordance with one embodiment of the present disclosure;

FIG. 3 is an illustrative diagram showing a cross-sectional view of the unassembled force sensor in accordance with one embodiment of the present disclosure;

DETAILED DESCRIPTION

Figure 4:
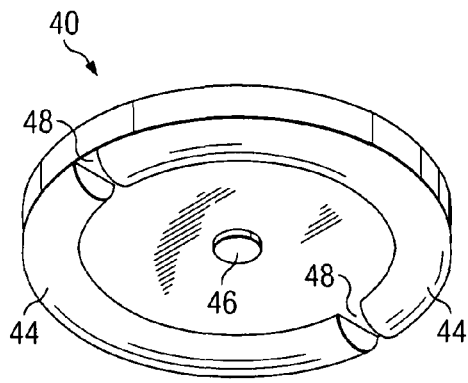
FIG. 4 is an illustrative diagram showing a bottom perspective view of the membrane in FIG. 2.

The present disclosure may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

The present disclosure generally provides a force sensor 11 for measuring a force applied thereon. Referring to FIGS. 2 and 3, the force sensor 11 includes a plunger 20, a membrane 40, a support plate 60, and a silicon die 10, wherein the force sensor 11 has a central axis A-A. The plunger 20, the membrane 40, and the support plate 60 are preferably made of steel or other types of metal, or metal alloys. The silicon die 10 is a sensor chip including piezo-resistors, wherein the resistance of the piezo-resistors varies according to the deformation of the silicon die 10. It should be understood that other suitable types of sensors that deform to provide a force measurement could also be used. For example, a fiber Bragg grating (FBG) optical fiber sensor or a strain gauge could also be used according to one embodiment of the present disclosure.

Still referring to FIGS. 2 and 3, the plunger 20 is a cup-shaped body having a center aligned to the central axis A-A according to one embodiment of the present disclosure. The bottom surface of the plunger 20 has a ring-shaped groove 22, wherein the ring-shaped groove 22 has a center aligned to the central axis A-A. The membrane 40 is a disc-shaped body with a center aligned to the central axis A-A, wherein the membrane 40 has a ring-shape upper bump 42 at the upper surface and a ring-shape lower bump 44 at the lower surface. The upper bump 42 is an integral part of the membrane 40, wherein the upper bump 42 has a center aligned to the central axis A-A. Similarly, the lower bump 44 is an integral part of the membrane 40, wherein the lower bump 44 has a center aligned to the central axis A-A.

Figure 5:
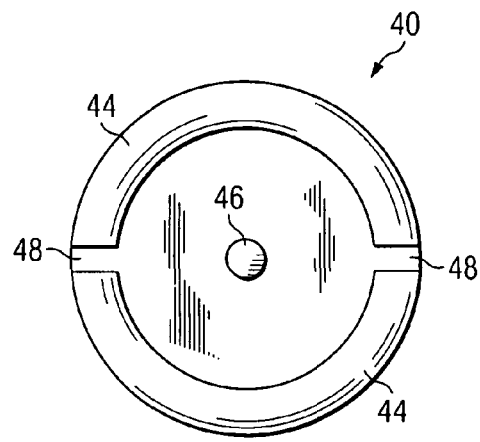
FIG. 5 is an illustrative diagram showing a bottom plan view of the membrane in FIG. 2.

In one embodiment, the diameter of the ring-shaped upper bump 42 is less than the diameter of the ring-shaped lower bump 44. Furthermore, the bottom surface of the membrane 40 has a convex step 46, wherein the step 46 is centrally disposed on the bottom surface of the membrane 40. The step 46 supports the silicon die 10 between the membrane 40 and the support plate 60, wherein the step 46, in use, facilitates the transmission of force to the silicon die 10. Referring to FIGS. 4 and 5, the lower bump 44 could include a plurality of gaps 48 that provide passages for electrical connectors to couple the silicon die 10 to other electronic components. It should be understood that other suitable methods of connecting the silicon die 10 to electronic components could be used in accordance with the present disclosure.

Figure 6:
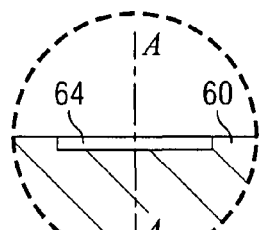
FIG. 6 is an illustrative diagram showing an enlarged cross-sectional view of the depression in the support plate in accordance with one embodiment of the present disclosure.

Referring back to FIGS. 2 and 3, the fixed support plate 60 is a disc-shaped body having a center aligned to the central axis A-A according to one embodiment of the present disclosure. A ring-shaped groove 62 is formed at the upper surface of the support plate 60, wherein the ring-shaped groove 62 has a center aligned to the central axis A-A. Referring to FIG. 6, the support plate 60 may comprise a depression 64 for supporting the silicon die 10, wherein the silicon die 10 is secured between the depression 64 and the step 46 at the bottom of the membrane 40.

Figure 7:
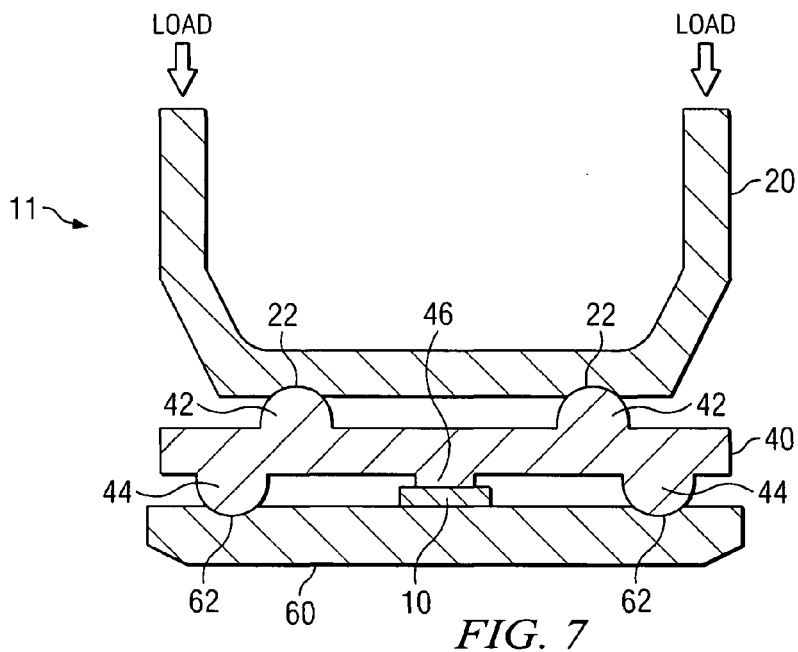
FIG. 7 is an illustrative diagram showing a cross-sectional view of the assembled force sensor in accordance with one embodiment of the present disclosure.

FIG. 7 is a cross-sectional view of the configuration of the assembled force sensor 11 according to one embodiment of the present disclosure. The upper surface of the plunger 20 is coupled to a load, wherein the plunger 20 receives a force from the load. The upper bump 42 of the membrane 40 is configured to complementarily fit into the groove 22 on the lower surface of the plunger 20. Furthermore, the lower bump 44 of the membrane 40 is configured to complementarily fit into the groove 62 at the upper surface of support plate 60. As discussed above, the silicon die 10 is disposed between the step 46 and the upper surface of the support plate 60.

The configuration of the assembled force sensor 11 generally operates under the principles of a lever mechanism, as discussed above. Without intention to be bound by any particular theory or principle, the membrane 40 performs both the lever and fulcrum functions. Specifically, the lower bump 44 of the membrane 40 acts as the fulcrum element that supports the membrane 40 on the support plate 60, and wherein the membrane 40 also acts as the lever element. When the plunger 20 receives a force from the load, the force is transmitted to the membrane 40, causing the membrane 40 to flex.

The flexing of the membrane 40 bends and/or compresses the silicon die 10, resulting in the measurement of the force from the load by the silicon die 10. Typically, the force received by the plunger 20 is too large for the silicon die 10 to measure directly. Hence, the membrane 40 is configured to attenuate the actual amount of force from the plunger 20 for measurement by the silicon die 10. During flexing of the membrane 40, the upper bump 42 transmits a large proportion of the force to the lower bump 42, wherein a smaller proportion of the force is transmitted to the silicon die 10.

The thickness of the membrane 40 and the diameters of the ring-shaped bumps (42, 44) on the membrane 40 could be predetermined to ensure that the silicon die 10 measures the force from the load accurately and reliably. Furthermore, the step 46 could be provided to facilitate the compression on the silicon die 10. In the present configuration, the upper bump 42 and lower bump 44 are disposed on the membrane 40 to reduce the stress induced on the membrane 40 by the force transmitted from the plunger 20 and supporting plate 60. Hence, in one embodiment, the reliability and durability of the force sensor 11 is significantly improved.

Figure 12:
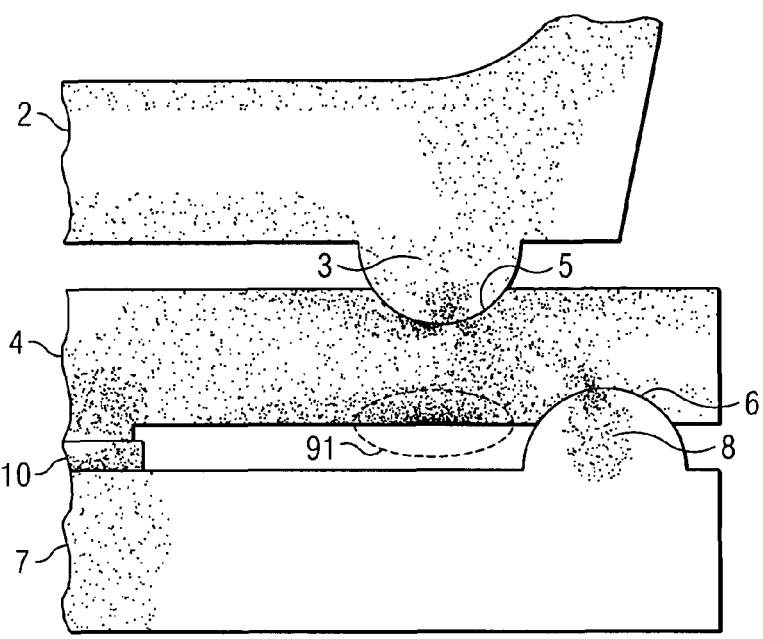
FIG. 12 is a graphic simulation of the stress level on the membrane of a force sensor illustrated in FIG. 1.
Figure 13:
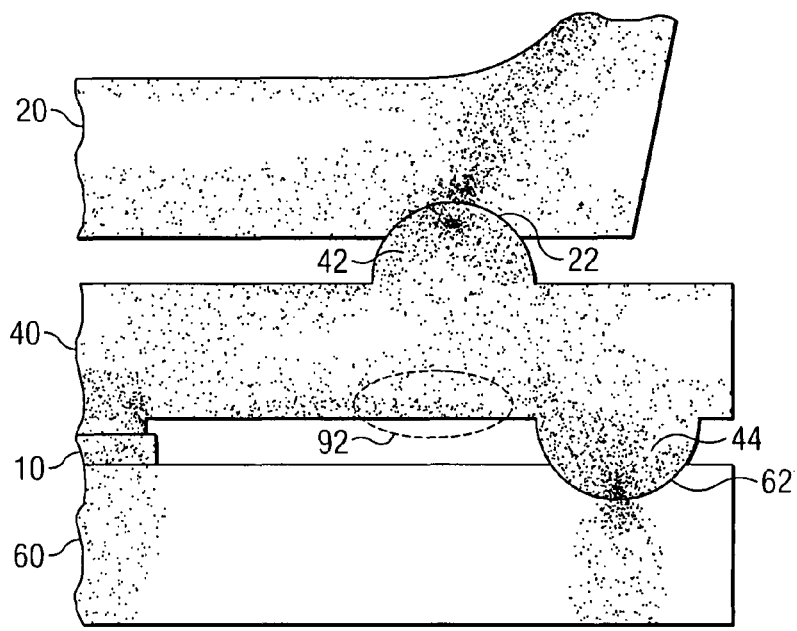
FIG. 13 is a graphic simulation of the reduced stress level on the membrane of a force sensor in accordance with one embodiment of the present disclosure.

Mechanical simulations have been carried out to evaluate and compare the level of stress induced on the membrane. FIG. 12 illustrates a partial view of the force sensor 1, showing the simulation results of stress induced on the membrane 4. As described above, the membrane 4 has a groove 5 at the upper surface configured to complementarily receive a bump 3 on the plunger 2. Furthermore, the membrane 4 also has another groove 6 at the lower surface configured to complementarily receive a bump 8 on the support plate 7. When the plunger receives a force from the load, the portion 91 below the groove 5 is subjected to a high level of stress. FIG. 13 is a partial view of the force sensor 11 of the present invention, showing the simulation results of stress induced on the membrane 40. In particular, FIG. 13 shows that the stress level at the portion 92 below the upper bump 42 is significantly lower relative to FIG. 12.

Figure 8:
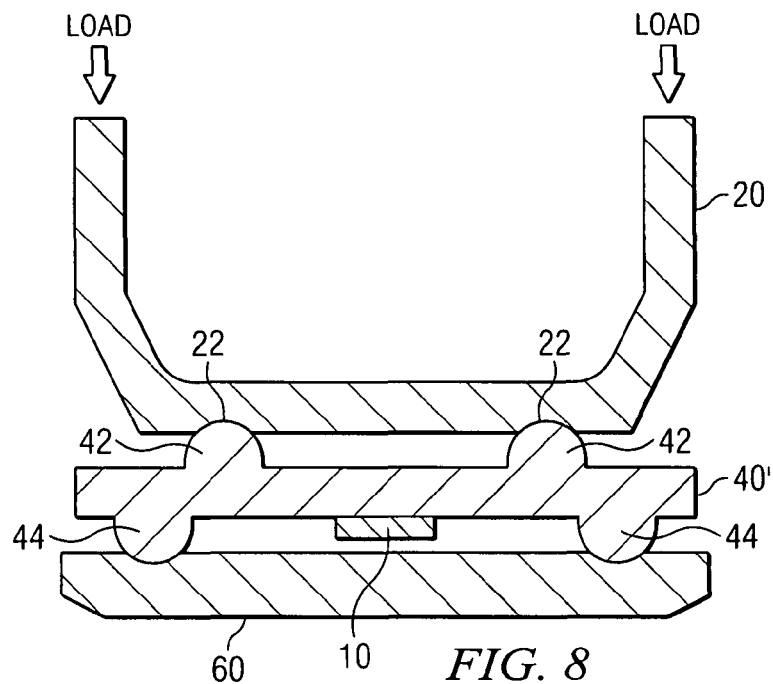
FIG. 8 is an illustrative diagram showing a cross-sectional view of the assembled force sensor in accordance with one embodiment of the present disclosure.

FIG. 8 shows an alternative embodiment of the force sensor 11, wherein the silicon die 10 is directly mounted at the center of the lower surface of membrane 40'. When the plunger 20 receives a force and flexes the membrane 40', the flexing of the membrane 40' causes the silicon die 10 to bend accordingly. The bending of the silicon die 10 results in the measurement of the force from the load. Alternatively, the silicon die 10 could be mounted at the center of the upper surface membrane 40', wherein the flexing of the membrane 40' causes the silicon die 10 to bend.

Figure 9:
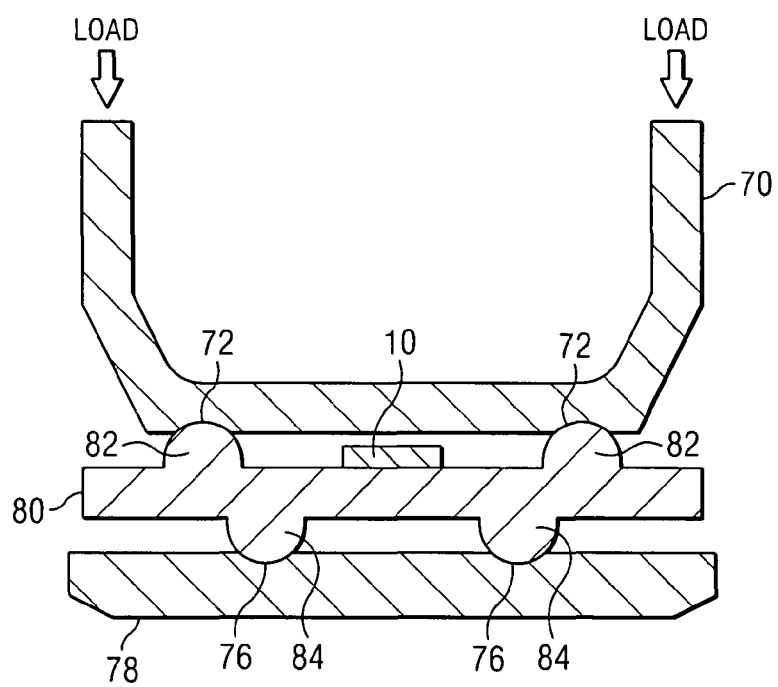
FIG. 9 is an illustrative diagram showing a cross-sectional view of the assembled force sensor in accordance with one embodiment of the present disclosure.

FIG. 9 shows another alternative embodiment of the force sensor 11, wherein the membrane 80 has an upper bump 82 at the upper surface and a lower bump 84 at the lower surface according to one embodiment of the present disclosure. In particular, the upper bump 82 is configured with a larger diameter relative to the lower bump 84. Furthermore, the upper bump 82 is configured to complementarily fit into the groove 72 at the lower surface of the plunger 70. The lower bump 84 is configured to complementarily fit into the groove 76 at the upper surface of the support plate 78. The silicon die 10 is preferably centrally mounted on the upper surface of the membrane 80. When the plunger 70 receives a force and flexes the membrane 80, the flexed membrane 80 causes the silicon die 10 to bend accordingly. The bending of the silicon die 10 results in the measurement of the force from the load. Alternatively, the silicon die 10 could be centrally mounted on the lower surface of the membrane 80, wherein the flexing of the membrane 80 causes the silicon die 10 to bend.

Figure 10:
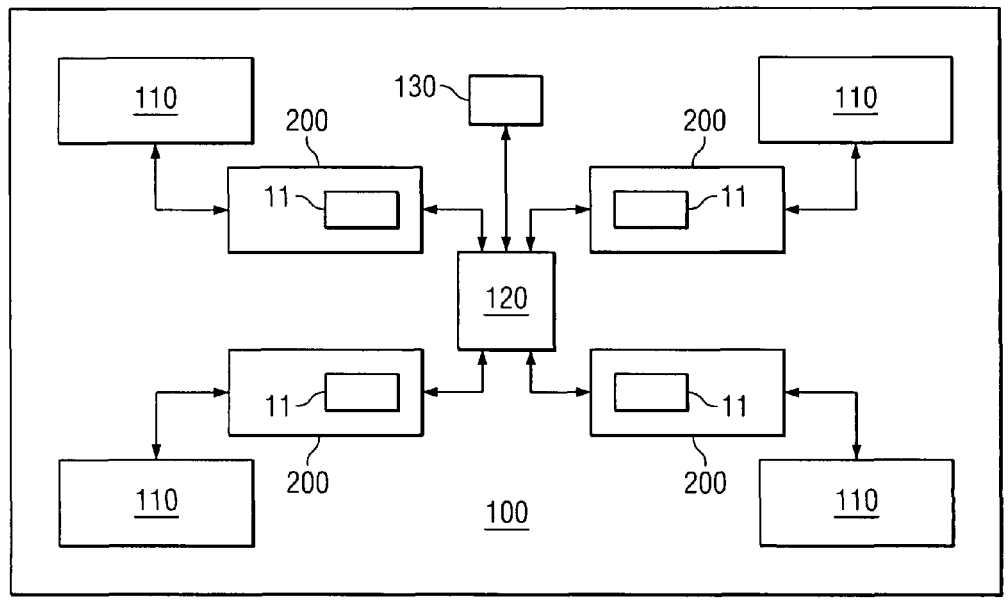
FIG. 10 is a block diagram illustrating a vehicle braking system in accordance with one embodiment of the present disclosure.

In one embodiment, the force sensor 11 of the present disclosure could be used in a braking system 100 of a vehicle with brake by wire technology. Referring to FIG. 10, the brake pedal 130 is electrically coupled to the plurality of braking devices 200 via a control unit 120. The control unit 120 receives the driver's input from the brake pedal 130 to control the operation of the plurality of braking devices 200. Furthermore, each braking device 200 includes a force sensor 11 of the present invention, wherein the force sensor 11 measures the braking force of the wheel 110. Based on the driver's input and the vehicle's operation from the force sensors 11, the control unit 120 automatically adjusts the braking operation to maintain safety.

Figure 11:
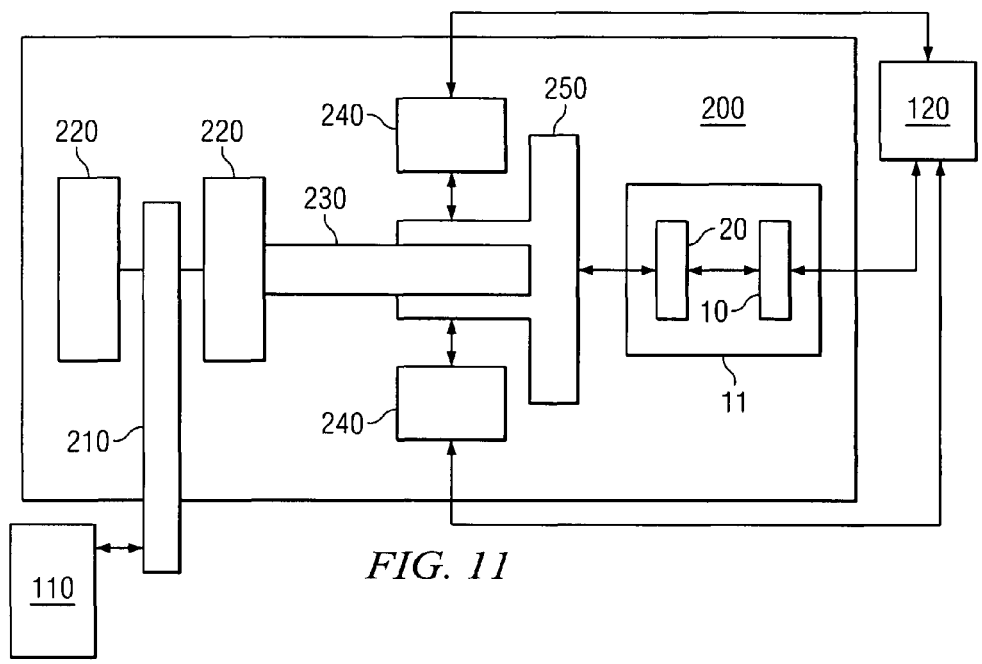
FIG. 11 is a somewhat simplified diagram illustrating a vehicle braking device in accordance with one embodiment of the present disclosure.

FIG. 11 is a simplified diagram illustrating the components of a braking device 200 according to one embodiment of the present disclosure. The braking device 200 comprises a disc 210 coupled to the wheel 110 of the vehicle, wherein the disc 210 rotates with the rotation of the wheel 110. Typically, the disc 210 is disposed between two pads 220, wherein the two pads 220 provide a clamping force on the disc 210 to apply a braking pressure on the wheel 110. A screw 230 is coupled to the pads 220, wherein the screw 230 can be driven to move the pads 220 relative to the disc 210. Furthermore, the screw 230 is coupled to the electric motors 240 via a reduction gear 250, wherein the reduction gear 250 is provided to transform the rotational motion of the electric motors 240 to the translation movement of the screw 230. The control unit 120 controls the electric motors 240 to generate or adjust the braking pressure on the wheel 110. In the present embodiment, the force sensor 11 is coupled to the reduction gear 250. In particular, the reduction gear 250 acts as a load on the plunger 20 of the force sensor 11, wherein the movement of the reduction gear 250 varies the load on the plunger 20 and changes the state of the silicon die 10. As a result, the silicon die 10 generates an electronic signal corresponding to the force applied from the reduction gear 250, wherein the electronic signal is transmitted to the control unit 120.

During a braking action, each of the wheels 110 may be subjected to different amounts of braking force, which may cause the vehicle to swerve or even overturn. The control unit 120 is provided to adjust the braking force on each wheel 110 based on the electronic signals received from each force sensor 11. In particular, the control unit 120 receives and processes the electronic signals from the silicon die 10 of each force sensor 11. Based on the electronic signals from the force sensor 11 and the input from the brake pedal 130, the control unit 120 controls the electric motors 240 accordingly to apply the correct amount of braking pressure on each wheel 110, thereby achieving a better braking performance for the vehicle. Although the foregoing description discloses a force sensor 11 for use in vehicle braking systems, it should be understood that the force sensor 11 could be applied in any suitable electro-mechanical system that measures and controls the application of force.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device to measure the force from a load, the device comprising:
   a plunger configured to receive the force from the load, wherein a lower surface of the plunger has a ring-shaped first groove;
   a disc-shaped membrane having an upper surface and lower surface, wherein the membrane is flexible according to the force received by the plunger, wherein the upper surface of the membrane has a ring-shaped first bump configured to complementarily fit into the first groove on the lower surface of the plunger, and wherein the lower surface of the membrane has a ring-shaped second bump;
   a sensor centrally disposed on the membrane, wherein the sensor measures the force of the load when being bent or compressed caused by the membrane; and
   a support plate having a ring-shaped second groove configured to complementarily fit into the second bump, wherein the force received by the plunger from the load is transmitted to the membrane, causing the membrane to flex, which in turn causes the bending or compressing of the sensing means, resulting in the measurement of the force from the load.

2. The device according to claim 1 further comprising:
   a convex step centrally disposed on the lower surface of the membrane to secure the sensor between the lower surface of the membrane and the support plate.

3. The device according to claim 2, wherein the support plate further comprises a depression configured to support the silicon die.

4. The device according to claim 2, wherein the ring-shaped second bump has at least one gap to provide a passage for an electrical connector to couple the silicon die to other electronic components.

5. The device according to claim 1, wherein the sensor is centrally mounted on the upper surface of the membrane.

6. The device according to claim 1, wherein the sensor is centrally mounted on the lower surface of the membrane.

7. The device according to claim 1, wherein the ring-shaped first bump has a smaller diameter than the ring-shaped second bump.

8. The device according to claim 1, wherein the ring-shaped first bump has a larger diameter than the ring-shaped second bump.

9. The device according to claim 1, wherein the sensor is a silicon die with a plurality of integrated piezo-resistors having a varying resistance when bent or compressed.

10. A braking system coupled to at least one wheel of a vehicle to control the braking force on the wheel, the braking system comprising:
    a pedal to apply initial braking pressure to the wheel;
    a braking device coupled to the wheel and configured to apply the initial braking pressure on the wheel; and
    a sensor to measure the braking pressure applied to the wheel, the sensor comprising:
    a plunger configured to receive the applied braking force, and having a ring-shaped first groove on a lower surface of the plunger;
    a disc-shaped membrane having an upper surface and lower surface, wherein the membrane is flexible according to the applied braking force received by the plunger, wherein an upper surface of the membrane has a ring-shaped first bump configured to complementarily fit the first groove, and wherein the lower surface of the membrane has a ring-shaped second bump;
    a sensing circuit centrally disposed on the membrane, wherein the sensing circuit measures the applied braking force when being bent or compressed caused by the membrane;
    a support plate having a ring-shaped second groove configured to complementarily fit the second bump, whereby the applied braking force received by the plunger is transmitted to the membrane, causing the membrane to flex, which in turn causes the bending or compressing of the sensing circuit, resulting in the measurement of the applied braking force; and
    a control unit electrically coupled to the braking device to control the braking pressure on the wheel, wherein the control unit is configured to receive the measurement of the applied braking force from the braking device, and to process the measurement of the applied braking force to control the braking pressure on the wheel.

11. The braking system according to claim 10, wherein the braking device applies the braking pressure on a disc mounted on the wheel.

12. The braking system according to claim 11, wherein the braking device further comprises a plurality of brake pads to apply the braking pressure on the wheel.

13. The braking system according to claim 12, wherein the braking device further comprises:
    a plurality of electric motors coupled to the plurality of brake pads, wherein the plurality of electric motors drive the plurality of brake pads to apply the braking pressure on the wheel.

14. The braking system according to claim 13, wherein the plurality of electric motors are coupled to the plurality of brake pads via reduction gear, the reduction gear configured to transform the rotational motion of the plurality of electric motors to the translation motion of the plurality of brake pads, thereby causing the plurality of brake pads to apply the braking pressure on the wheel.

15. The braking system according to claim 14, wherein the reduction gear is coupled to the plunger of the sensor to enable the sensor to measure the braking pressure applied to the wheel.

16. The braking system according to claim 10, wherein the sensing circuit is coupled to the control unit.

17. The braking system according to claim 10, wherein the membrane of the sensor further comprises a convex step centrally disposed on the lower surface, wherein the convex step secures the sensing circuit between the lower surface of the membrane and the support plate.

18. The braking system according to claim 17, wherein the support plate of the sensor further comprises a depression configured for supporting the silicon die.

19. The braking system according to claim 17, wherein the ring-shaped second bump has at least one gap that provides a passage for an electrical connector to couple the silicon die to other electronic components.

20. The braking system according to claim 10, wherein the sensing circuit is centrally mounted on the upper surface of the membrane.

21. The braking system according to claim 10, wherein the sensing circuit is centrally mounted on the lower surface of the membrane.

22. The braking system according to claim 10, wherein the ring-shaped first bump has a smaller diameter than the ring-shaped second bump.

23. The braking system according to claim 10, wherein the ring-shaped first bump has a larger diameter than the ring-shaped second bump.

24. The braking system according to claim 10, wherein the sensing means is a silicon die with a plurality of integrated piezo-resistors that vary their resistance when bent or compressed.

* * * * *